United States Patent [19]

Gavagan et al.

[11] 4,413,385
[45] Nov. 8, 1983

[54] INVERSE CLEVIS SAFETY BELT BUCKLE

[75] Inventors: James A. Gavagan, Centerline; William E. Brennan, Troy, both of Mich.

[73] Assignee: Irvin Industries, Inc., Madison Heights, Mich.

[21] Appl. No.: 253,200

[22] Filed: Apr. 13, 1981

[51] Int. Cl.³ .............................................. A44B 11/26
[52] U.S. Cl. ................................................. 24/230 A
[58] Field of Search ........ 24/230 A, 230 AL, 230 AP, 24/230 R, 230 AK

[56] References Cited

U.S. PATENT DOCUMENTS

| | | | |
|---|---|---|---|
| 3,574,902 | 4/1971 | Lohr | 24/230 A |
| 3,760,467 | 9/1973 | Lohr | 24/230 A |
| 3,956,603 | 5/1976 | Fisher | 24/230 A |
| 4,069,558 | 1/1978 | Eberhart | 24/230 R |

*Primary Examiner*—Hugh R. Chamblee

[57] ABSTRACT

A safety belt buckle wherein a conventional latch for engaging an apertured tongue of a conventional connector is pivotally seated within the base loop of an inverse clevis having an opening for insertion of the tongue and a solid transverse interior surface confining the engaged end of the latch against pivotal displacement incident to latch angularity under ultimate tensile belt loads sufficient to deflect the channel sides of conventional stamped frames characteristic of prior art seat belt buckles.

14 Claims, 20 Drawing Figures

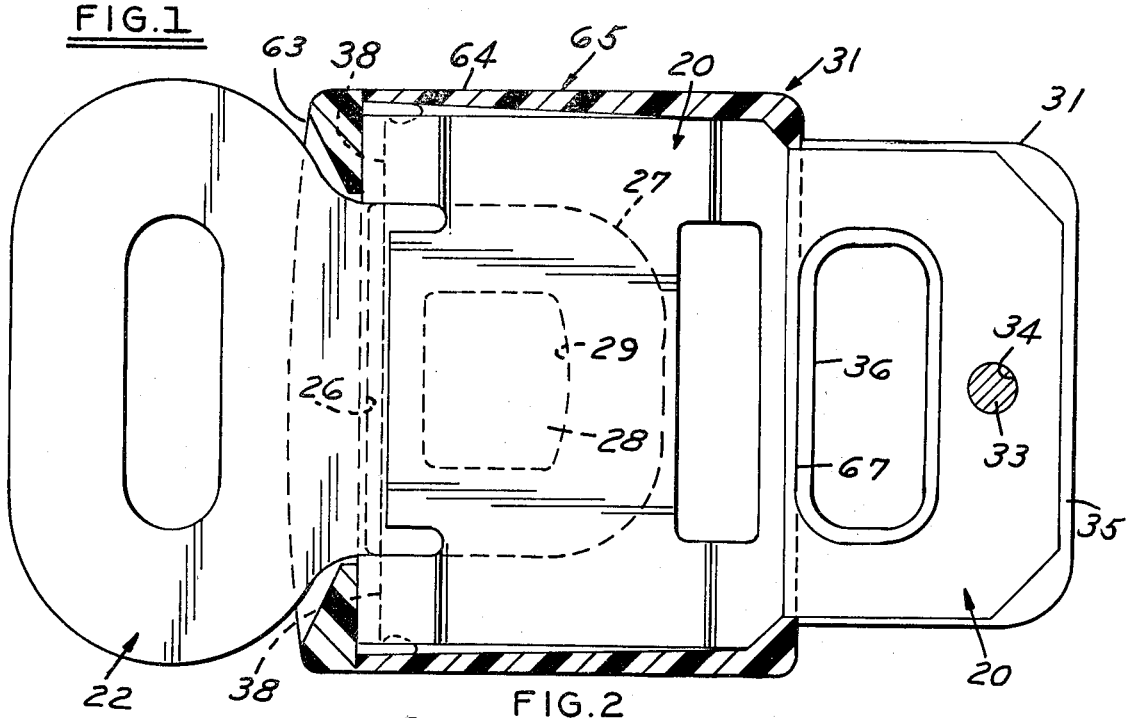
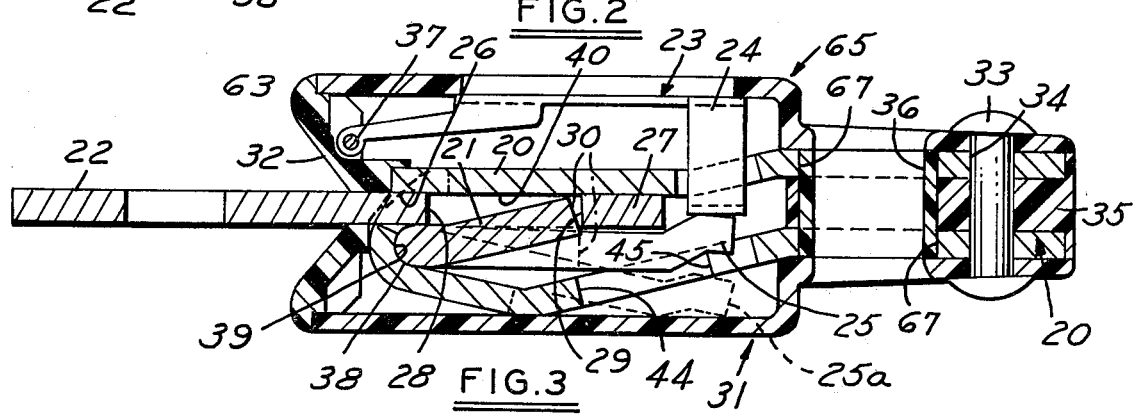
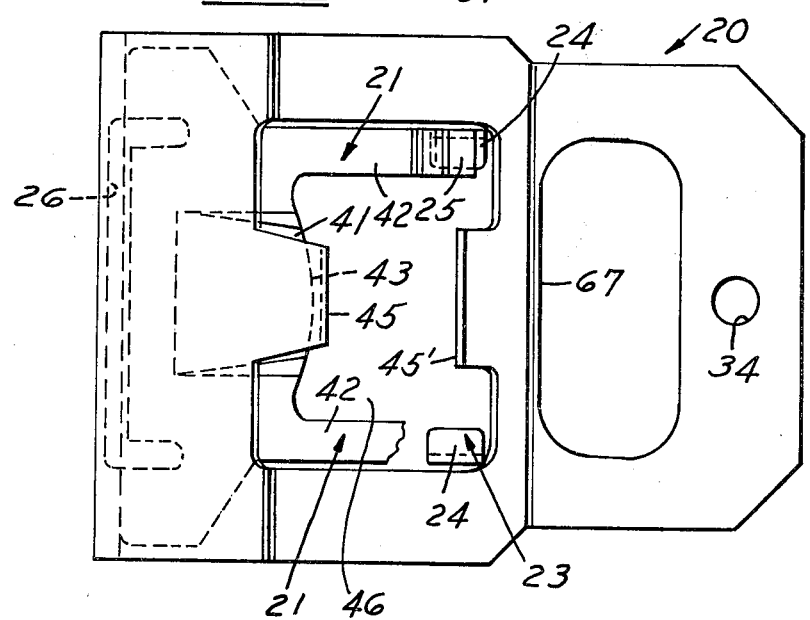

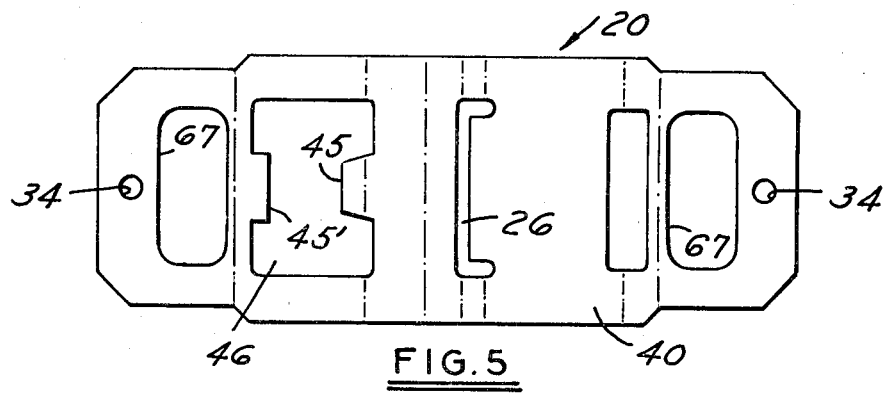
FIG.5
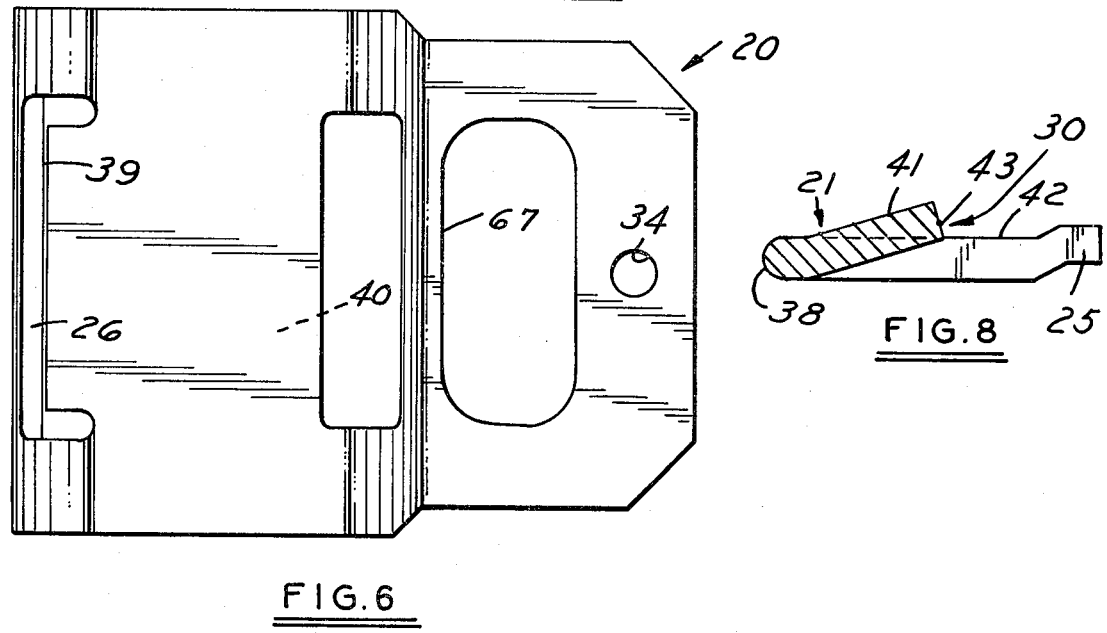
FIG.6
FIG.8
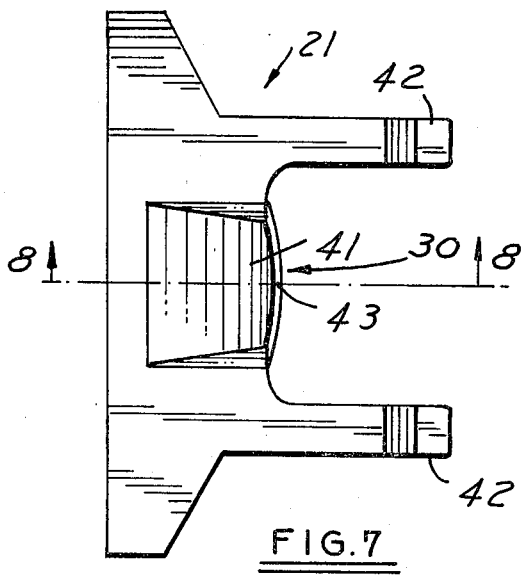
FIG.7
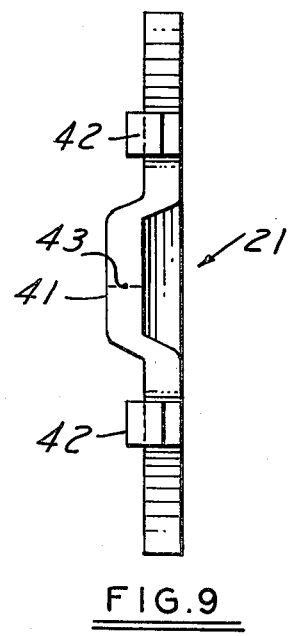
FIG.9

INVERSE CLEVIS SAFETY BELT BUCKLE

BACKGROUND OF THE INVENTION

Known prior art safety belt buckle constructions which typically includes a stamped open frame with channel sides limiting pivotal latch deflection under load include the following U.S. Pat. Nos. 3,131,451; 3,237,256; 3,242,546; 3,274,655; 3,277,548; 3,449,800; 3,465,393; 3,483,599; 3,588,969; 3,623,191; 3,639,951; 3,686,720; 3,716,895; 4,015,094; 4,052,775; 4,060,879; 4,064,603.

Under heavy test loading it has been found that the channels of such typical safety belt buckle frames formed as sheet metal stampings provide limited resistance for retaining the latched tongue against deflection incident to the angularity between the latch pivotal engagement with the reaction surface of the frame and the latch engagement with the apertured tongue of the connector. Another critical area of limited strength in the prior art stamped frames is the reaction surface for the latch normally formed with a right angle bend at the end of the frame which is engaged by the base of the latch. In each case heavy loading on the belt subjects the stamped channels and reaction base of the frame to critical bending loads inherently incident to the unsupported extremities of the stamping channel and angle edges.

SUMMARY OF THE PRESENT INVENTION

In order to provide an inherently stronger substitute for the conventional stamped open frame with channel sides, and inverted clevis construction has been employed in the buckle disclosed herein which is formed as a sheet metal stamping doubled over to provide a loop centrally slotted for insertion of the connector tongue with sides of the loop as well as an angle seat adjacent the tongue slot forming a pivotal base for a latch which in its engaged position with the connector tongue registers against a solid portion of one side of the clevis unyieldingly resisting any deflection load imposed on the latch through belt tension under the most severe test loading.

BRIEF DESCRIPTION OF THE DRAWINGS

FIG. 1 is a plan view of clevis and connector components of a preferred embodiment with plastic cover shown in phantom;

FIG. 6 is a plan view of the clevis per se;

FIGS. 7, 8 and 9 are respective plan, side and end views of the latch per se;

With reference to FIGS. 1, 2 and 3 the main elements of the preferred embodiment include inverse clevis 20, latch 21, connector 22, and release lever 23 having projections 24 engaging latch extensions 25. Slotted opening 26 in the loop end of clevis 20 admits insertion of connector tongue 27 having latch engaging aperture 28 with an arcuate surface 29 adapted to engage arcuate end 30 of latch 21.

Figure 4:
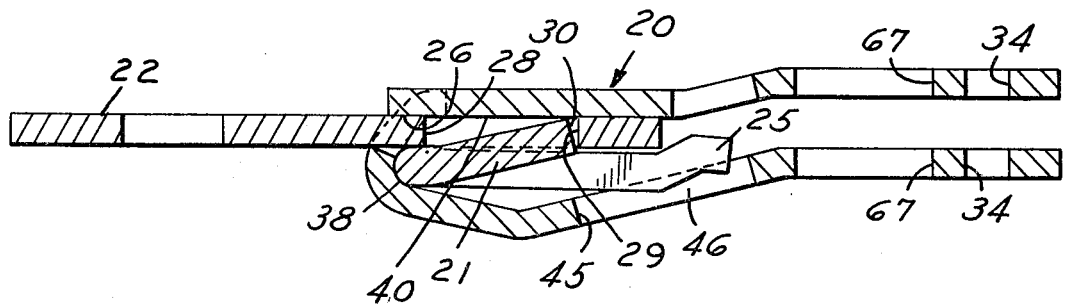
FIG. 4 is a central sectional side elevation of the clevis and latch shown in FIG. 2.

Plastic cover 31 shown hatched in FIGS. 1 and 2 includes guide opening 32 for connector tongue 27 and is riveted at 33 through apertures 34 in the ends of clevis 20 with plastic inserts 35 and 36 adapting the ends of clevis 20 for connection to a belt end (not shown). The plastic end 32 of cover 31 also provides an anchor point for release lever pivot 37 accommodating movement of latch extensions 25 to dotted line position 25a, against a latch spring hereinafter described, moving latch end 30 to a position for releasing tongue 27.

With the latch engaged as illustrated in FIGS. 2 and 4 the entire arcuate end 38 of latch 21 engages loop end 39 of clevis 20 below slotted opening 26 thus providing reaction support not only at the extremities of clevis 20 on either side of slotted opening 26 but also in the intermediate space below the slotted opening. It will also be seen that the entire solid upper surface 40 of clevis 20 serves to prevent any deflection of latch end 30 above the latching level illustrated in FIGS. 2 and 4 incident to the angularity of the latch tongue under high tensile loading of the belts (not shown) on the buckle elements. Thus, the superior strength of the inverse clevis, which substantially limits critical stresses to predominantly tensile and compressive loads and avoids the bending stresses imparted to unsupported channel edges and angle bends of prior art buckle frames, provides an inherently stronger buckle within the parameters of equal size and material thicknesses.

With reference to FIGS. 7 and 8 angularity in the order of 15° between the upper latch surface 41 and horizontal latch surface 42 together with latch end surface 30 normal to surface 41 results in an arcuate contact line 43 with arcuate connector tongue edge 29 of aperture 28, also formed with all sides normal to the surface plane of connector 22, inclined at approximately 5° relative to the pivotal axis of latch end 38 thereby providing a release component incident to belt tension on the buckle which is less than the angle of friction of the steel materials employed so that no extreme belt load can ever produce disengaging pivotal movement of the latch, although some assist in minimizing manual release forces required on the release lever under belt tension test loads is accomplished. Latch and connector contact surfaces 30 and 29 are preferably formed with a matching radius and with a latch harness substantially exceeding the connector so that any "brinelling" incident to high belt loads will take place on the connector increasing the initial line contact to a perfectly matching area contact without exceeding the ultimate strength of either element and without the need for special fitting of the contact surfaces other than provision of the same initial radius on surfaces normal to the face plane of each element.

Figure 5A:
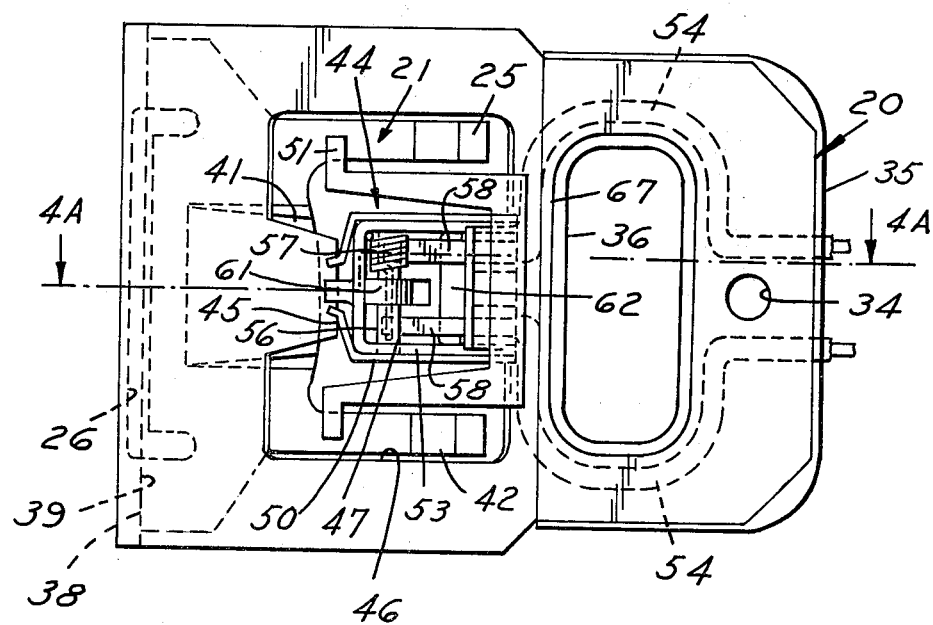
FIG. 5 is a plan view of the clevis stamped blank before forming.

The buckle has been described above with reference to FIG. 1 illustrating the relationship of connector and clevis with cover indicated in hatching; FIG. 2 adding the latch and release lever elements; FIG. 3 showing a bottom view of the clevis with opening for latch extensions engaged by release lever projections; FIG. 4 indicating the engaged relationship of latch and clevis per se; FIG. 5 illustrating the initial blanked configuration of the clevis stamping; and FIGS. 7, 8 and 9 showing the detailed construction of the latch per se.

Figure 2A:
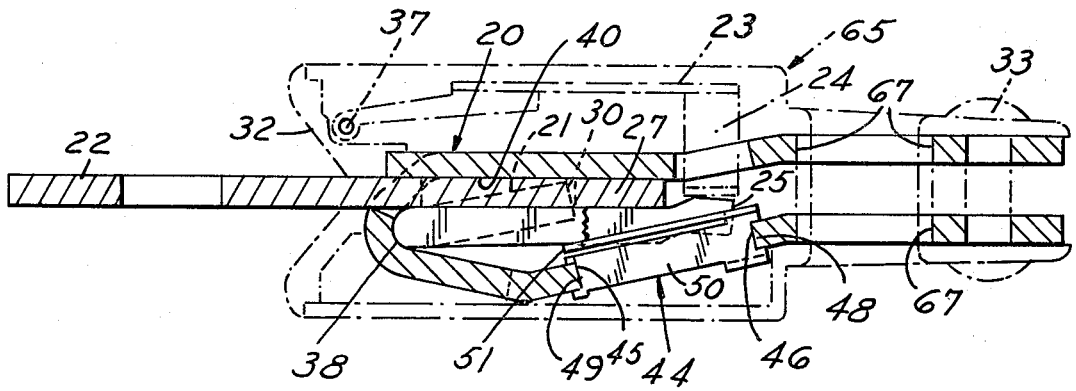
FIG. 2 is a side elevation with latch and release lever added.
Figure 3A:
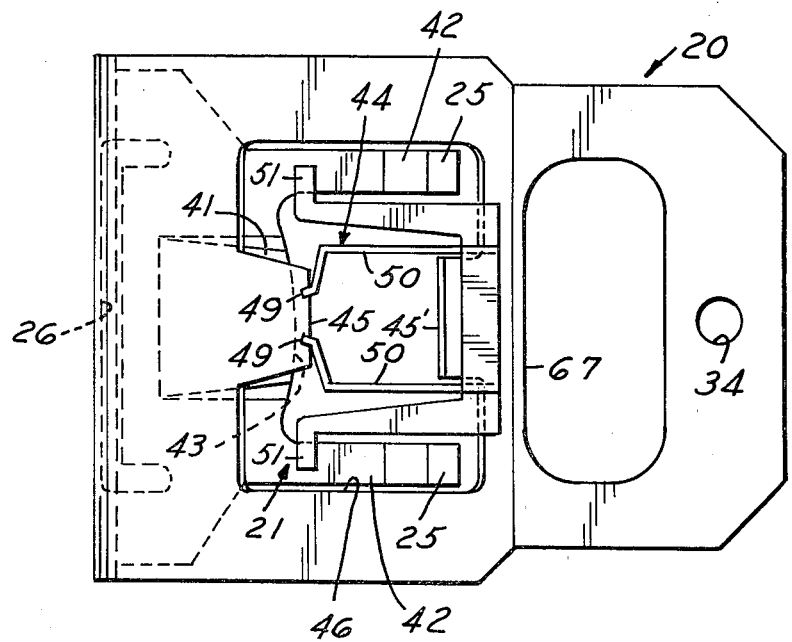
FIG. 3 is a bottom view of the clevis, latch and lever components.
Figure 4A:
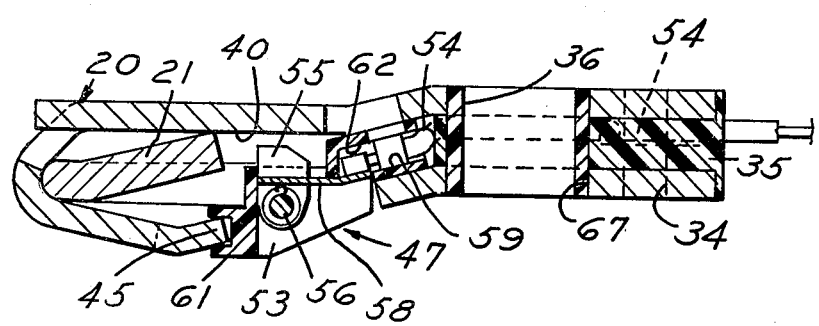
Figure 10:
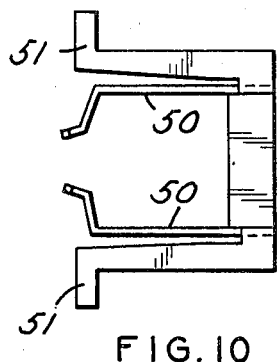
FIGS. 10, 11 and 12 are respective plan, side and end views of the spring per se illustrated in FIGS. 2A, 3A.
Figure 12:
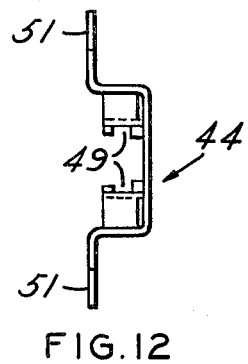
Figure 13:
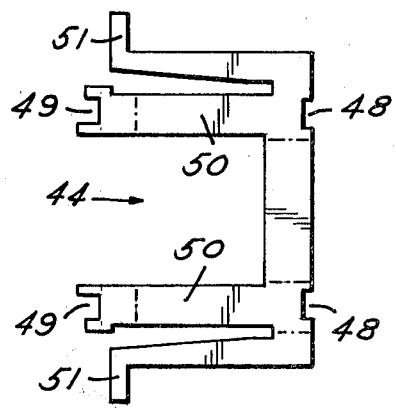
FIG. 13 is a plan view of the stamped blank for the spring illustrated in FIGS. 10, 11 and 12 before forming.
Figure 11:
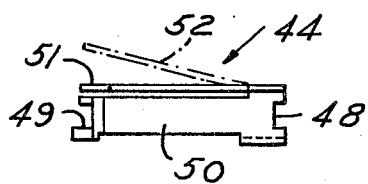

In FIGS. 2A and 3A an additional return spring 44 required for biasing the latch to engaging position which will resiliently yield to insertion of the connector tongue is illustrated superimposed on the similar FIGS. 2 and 3. Such return spring is illustrated per se in FIGS. 10, 11 and 12 and in initial blank form in FIG. 13. Spring 44 is anchored to projections 45 and 45' extending within opening 46 for latch extensions 25 and switch assembly 47, illustrated in detail in FIGS. 4A and 5A. With reference to FIGS. 11 and 13 notches 48 formed in the base of spring 44 engage the clevis stamping on each side of projection 45' and notches 49 formed in the ends of spring arms 50 engage projection 45 to provide an upward spring bias through spring arms 51, having a free position 52, against the underside of latch extensions 25. FIG. 13 illustrates initial blank form of spring 44 before being folded into operative configuration shown in FIGS. 10, 11 and 12, the latter figure omitting spring arms 50 to illustrate more clearly the spring arms 51 per se.

Figure 14:
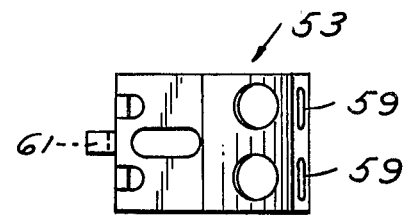
FIGS. 14, 15 and 16 are respective plan, side and bottom views of the switch housing per se illustrated in FIGS. 4A and 5A.
Figure 15:
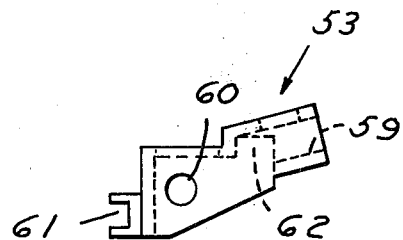
Figure 16:
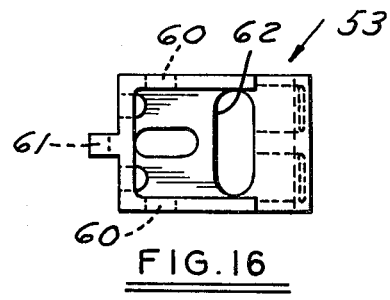

With reference to FIGS. 4a, 5a, 14, 15 and 16, switch assembly 47 includes a switch housing 53 illustrated per se in FIGS. 14, 15 and 16 in which an electrical switch for opening a normally closed circuit between two electrical lead wires 54 is produced by engagement of the leading edge of connector tongue 27 with projection 55 of a rotatable pin 56 having a coiled spring 57 wound on one side with each end thereof normally contacting lead extensions 58 associated with lead wires 54, rotation of projection 55 upon engagement of connector tongue 27 serving to rotate one end of coil spring 57 out of electrical contact breaking the circuit. Plastic switch housing 53 includes a pair of lead wire passages 59, a pair of holes 60 for spring pivot 56, notched projection 61 for engaging clevis projection 45, and recess 62 for accommodating lead wire connections.

Assembly of the buckle is accomplished by the steps of sliding the latch laterally into position within the clevis; inserting the switch housing; placing the spring over the switch housing; deflecting the ends of spring arms 50 to engage notches 49 with clevis projection 45; snapping cover frontal end 63 having retention tangs 64 into engagement with loop extremities 39 of clevis 20, thereby positioning preassembled release lever 23 with its projections 24 into operative engagement with latch extensions 25; inserting plastic end spacer 35 between clevis ends; insertion of plastic sleeve 36 in clevis opening 67, applying main plastic cover body 65 over the clevis assembly and application of rivet 33 to complete assembly of the buckle.

I claim:

1. A safety belt buckle characterized by a sheet metal loop formed clevis having apertured ends for attachment to a first belt end, a fully surrounded slot in the clevis loop end extremity, a connector having an apertured end for attachment to a second belt end and a tongue insertable through said slot into close proximately with one side of said clevis, said tongue having an apertured end adapted for latch engagement, a latch having a reaction end extending beyond both extremities of said slot pivotally seated against slotted and unslotted portions of said loop end extremity within said clevis adjacent said slot having a latch projection engageable with said tongue apertured end and said one side of said clevis, resilient means biasing said latch toward said engaging position deflectable in response to manual insertion of said tongue, and manually operable means to deflect said latch and resilient means to a tongue releasing position.

2. A buckle as set forth in claim 1 including an access aperture in said one side for accommodating said manually operable means.

3. A buckle as set forth in claim 2 wherein said manually operable means comprises an exposed pivotally mounted release lever having side extensions through said aperture.

4. A buckle as set forth in claim 3 including latch side extensions engaged by said lever side extensions.

5. A buckle as set forth in claim 4 wherein said resilient means comprises a spring mounted on the other side of said clevis.

6. A buckle as set forth in claim 4 wherein said resilient means comprises a spring mounted on the other side of said clevis said spring including side extensions engaging said latch side and extensions.

7. A buckle as set forth in claim 6 including an electrical switch located between said spring side extensions.

8. A buckle as set forth in claim 6 including an electrical switch located between said spring side extensions said switch having a pivoted element engaged by said connector tongue in its latched position.

9. A buckle as set forth in claim 8 wherein said pivoted element has a coiled spring mounted thereon adapted to open an electrical circuit in response to tongue actuation of said pivoted element.

10. A buckle as set forth in claim 1 including a plastic housing frontal loop end piece having a slotted opening with guide surfaces for leading said connector tongue through said clevis slot to facilitate buckle engagement.

11. A buckle as set forth in claim 3 including a plastic housing main body having an access aperture for said release lever and a pair of end extensions covering said clevis aperturned ends.

12. A buckle as set forth in claim 11 wherein said housing includes a clevis end spacer insert recessed for a pair of switch lead wires.

13. A buckle as set forth in claim 12 wherein said housing includes a sleeve insert extending through aligned apertures in said clevis providing a shield for said lead wires and passage for said first belt end.

14. A buckle as set forth in claim 13 wherein said plastic cover main body is retained in assembled relation with said clevis by fastening means passing through aligned holes in said cover and clevis ends.

* * * * *